United States Patent [19]
Zackovich

[11] Patent Number: 6,095,748
[45] Date of Patent: Aug. 1, 2000

[54] VEHICLE LIFTING AND TOWING METHOD AND APPARATUS

[76] Inventor: Stanley E. Zackovich, 409 Floral Ave., Cle Elum, Wash. 98922

[21] Appl. No.: 09/152,002

[22] Filed: Sep. 11, 1998

[51] Int. Cl.[7] .................................................. B60P 3/12
[52] U.S. Cl. ............................................ 414/563; 280/402
[58] Field of Search ........................... 414/563; 254/124; 280/402

[56] References Cited

U.S. PATENT DOCUMENTS

| | | | |
|---|---|---|---|
| 4,797,057 | 1/1989 | Shoup et al. ............................. | 414/563 |
| 5,853,283 | 12/1998 | Grant ...................................... | 414/563 |

*Primary Examiner*—Steven A. Bratlie
*Attorney, Agent, or Firm*—Stratton Ballew PLLC

[57] ABSTRACT

A lifting method and apparatus is provided that is especially suited for mounting on a towing vehicle and for lifting a vehicle. The apparatus is compact and efficient and especially suited for mounting to a tow truck. The lifting apparatus includes a boom and a riser pivotably mounted to a frame. A riser plate is mounted to the top end of the riser. A camming crank is pivotably attached to the riser plate. A riser pivot hingeably connects the camming crank to the riser plate. An arm anchor is also mounted to the frame. Link arms connect the arm anchor to the camming crank. A crank actuator rotates the camming crank to pivot the riser. The crank actuator can rotate the camming crank to selectively pivot the riser toward or away from the arm anchor, to respectively raise or lower the attached boom. The crank actuator for rotating the camming crank is an extending and retracting hydraulic actuator, such as a hydraulic cylinder and piston.

12 Claims, 8 Drawing Sheets

VEHICLE LIFTING AND TOWING METHOD AND APPARATUS

TECHNICAL FIELD

The invention relates to a lifting method and apparatus, and more particularly to a vehicle lifting method and apparatus, especially suited for a tow truck.

BACKGROUND OF THE INVENTION

Repeatably and reliably lifting a heavy object requires a sturdy and well-built mechanism that must also be economical to produce. The vehicle towing industry requires tow truck mounted lifting mechanisms. One function of a tow truck's lifting mechanism is to lift an end of a vehicle and enable its transport without damage to the vehicle. A shortcoming in previous tow truck lifting mechanisms lies in their requirement of significant force to lift the vehicle. Therefore, a need exists for a lifting apparatus that is mountable on a tow truck and employs a mechanism for mechanical lift, to achieve vehicle lifts more effectively, using less force. Other industries, where heavy objects are routinely lifted, would also benefit from a method and apparatus that provides an improved lifting mechanism.

The structural support of known lifting mechanisms presents additional problems. For instance, in tow trucks, much of the weight of the towed vehicle must be supported by the lift mechanism. The transfer of this weight to the frame of the tow truck, through a system of hinges and pivots, challenges the structural strength of the lift mechanism. A shortcoming of currently used lift mechanisms is the poor balance between light weight and high strength. This is especially true in the new "wheel-lift" towing mechanisms, which have been developed to minimize damage to the towed vehicle and facilitate the extraction of the vehicle from a parallel parking space. Typically, wheel-lift towing mechanisms require a boom leg to be extended beneath the vehicle to be towed. The wheels of the vehicle are then attached by a wheel carriage assembly connected to the free end of the boom leg. The boom leg is then lifted or tilted and the vehicle is extracted without damage. Current wheel-lift systems with heavy booms, hinges and actuators, which are strong enough to lift heavy vehicles over years of steady use, are too heavy for the typical tow truck. Conversely, light weight lift mechanisms tend to be unreliable for the day-to-day rigors required in tow truck operation, or are simply unable to perform heavier lifts. Mechanical failures of these light weight mechanisms, from fatigue upon weight bearing members, are common. Therefore, a need exists for a lifting apparatus better able to structurally support the weight of the towed vehicle, efficiently transfer that weight to the frame of the tow truck and perform reliably over the life of the towing vehicle.

Tow trucks are typically retro-fitted with lift mechanisms. A lift mechanism manufacturer receives a tow truck at its factory, where the lift mechanism is added. The customization of a truck to receive a lift mechanism is a difficult task, requiring expert technicians. To simplify the installation and retro-fitting of a tow truck with the lift mechanism, the lift mechanism must be compact and also accommodate the frame configuration of the truck. A needs exists for a compact lift mechanism that accommodates the frame configuration of a tow truck and is especially suited for a retro-fit installation.

SUMMARY OF INVENTION

According to the invention, a method and apparatus for an improved lifting mechanism is provided. The mechanism is compact and efficient and especially suited for mounting to a tow truck. The invention comprises a vehicle lifting apparatus having a riser pivotably mounted to a frame. Preferably, the frame is a frame member of a towing vehicle, such as a tow truck. The riser has a top end and a riser base end. A boom is also mounted to the riser, proximate the riser base end. The boom has a free end and a boom base end. A riser plate is mounted to the riser, proximate to the top end of the riser. A camming crank is pivotably attached to the riser plate. A riser pivot hingeably connects the camming crank to the riser plate.

An arm anchor is also mounted to the frame. A minimum of a single link arm connects the arm anchor to the camming crank. Preferably, a plurality of link arms are utilized. The link arm and the arm anchor connect to form an arm anchor pivot, and the link arm and the crank connect to form a crank arm pivot.

A crank actuator rotates the camming crank about the riser pivot, and so pivots the riser on the base pivot. The crank actuator has an upper actuator end and a lower actuator end. An actuator pivot hingeably connects the camming crank to the upper end of the crank actuator. The lower actuator end of the crank actuator pivotably mounts to the riser, proximate the riser base end. The crank actuator can rotate the camming crank to selectively pivot the riser toward or away from the arm anchor, to respectively raise or lower the free end of the boom.

According to an aspect of the invention, the crank actuator for rotating the camming crank is an extending and retracting hydraulic actuator, such as a hydraulic cylinder and piston.

According to another aspect of the invention, the lifting apparatus is mounted on a towing vehicle.

According to another aspect of the invention, the lifting apparatus is mounted on a towing vehicle for lifting a vehicle.

The invention has the advantage of employing the principle of a mechanical lever in a lift mechanism to lift a vehicle more easily, using less force.

Another advantage of the invention is that the lift mechanism, when attached to a tow truck or the like, supports the weight of the towed vehicle and efficiently transfers the weight of the towed vehicle to the frame of the tow truck.

Yet another advantage of the invention is that the lift mechanism is especially suited for a retro-fit installation onto a tow truck. It is compact and accommodates the frame configuration of a tow truck.

DETAILED DESCRIPTION OF SPECIFIC EMBODIMENTS

Figure 1:
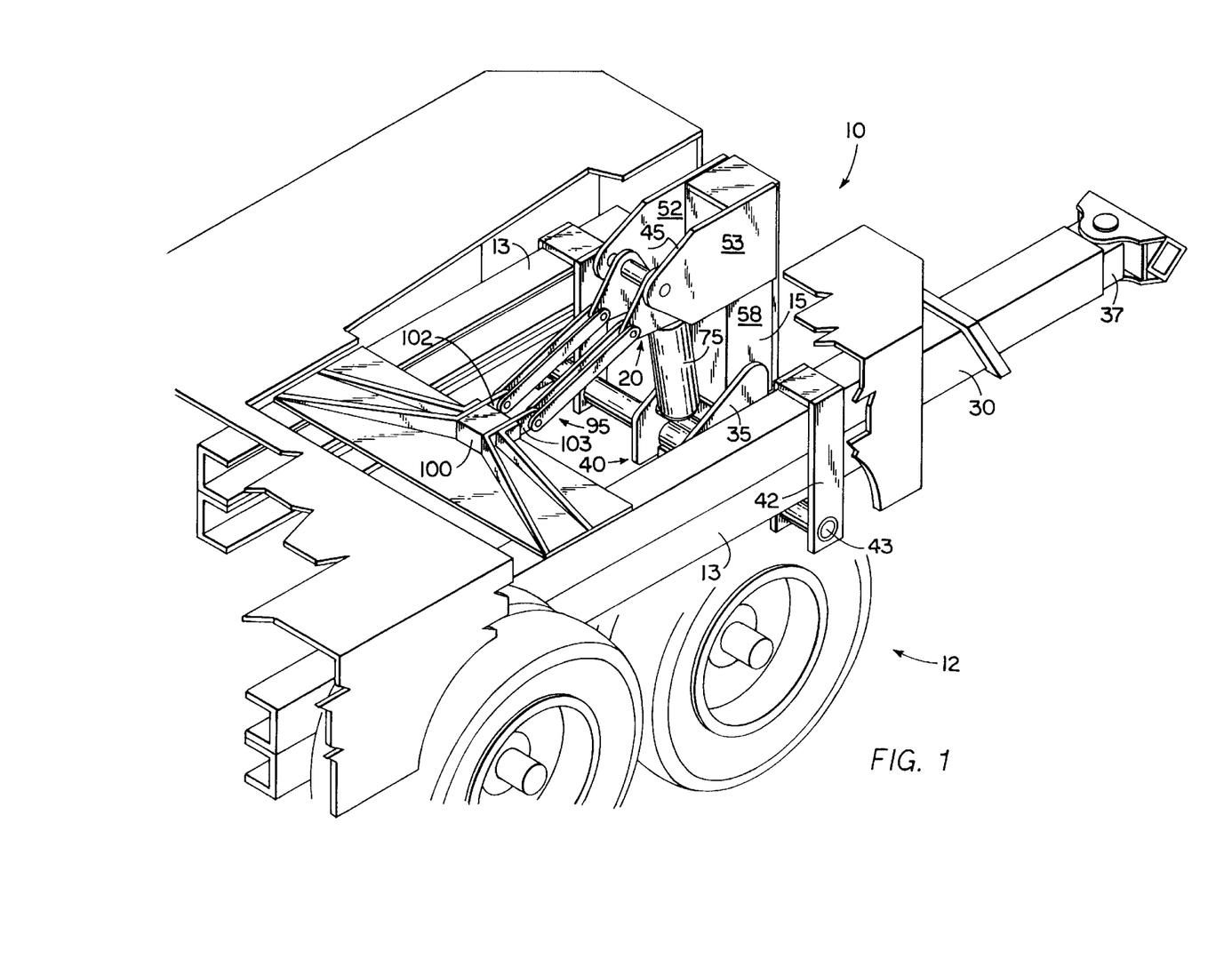
FIG. 1 is a cut away perspective diagram of a lifting apparatus, mounted to a towing vehicle, according to an embodiment of this invention.
Figure 3:
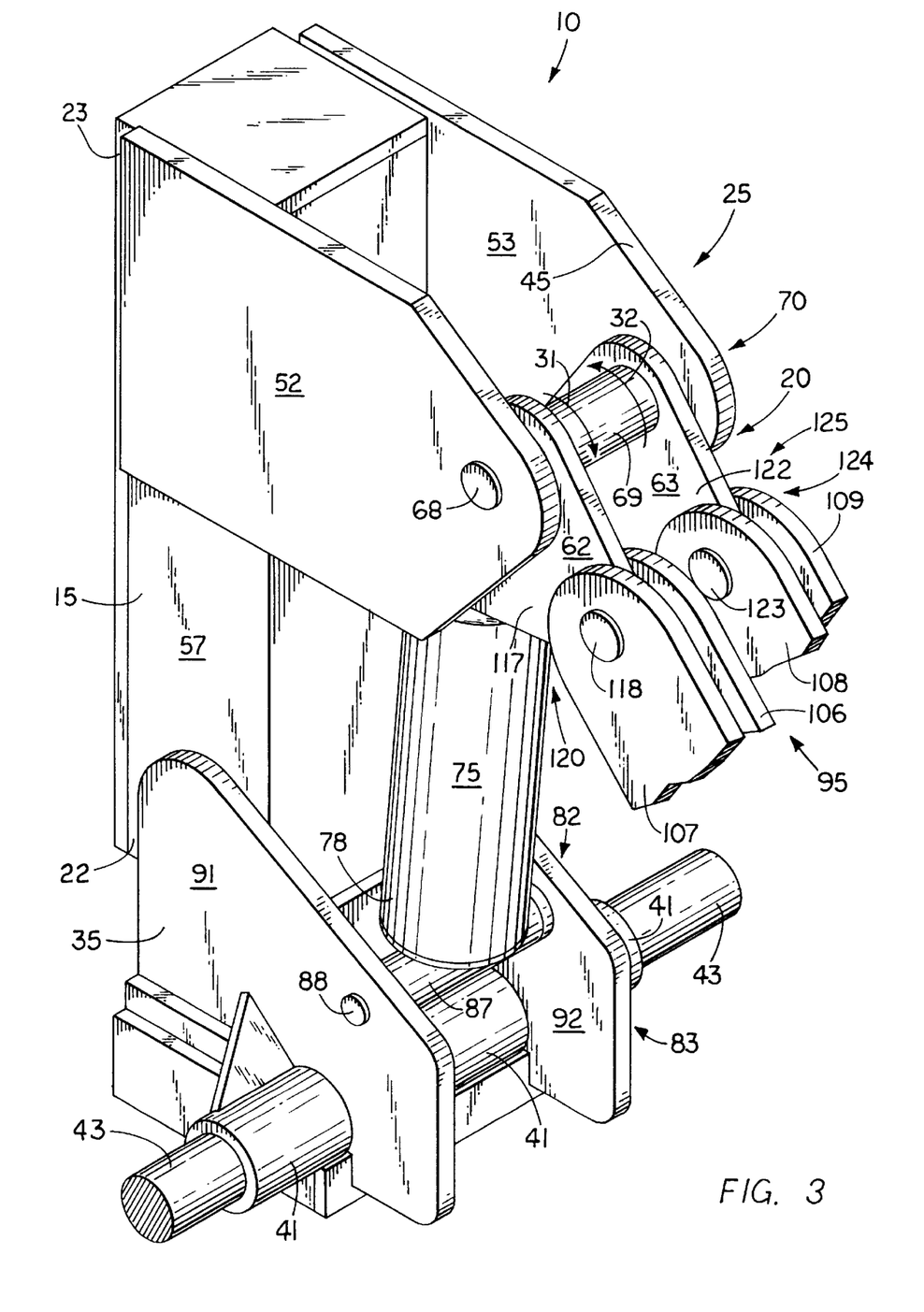
FIG. 3 is a perspective diagram of a portion of a lifting apparatus, according to an embodiment of this invention.
Figure 5:
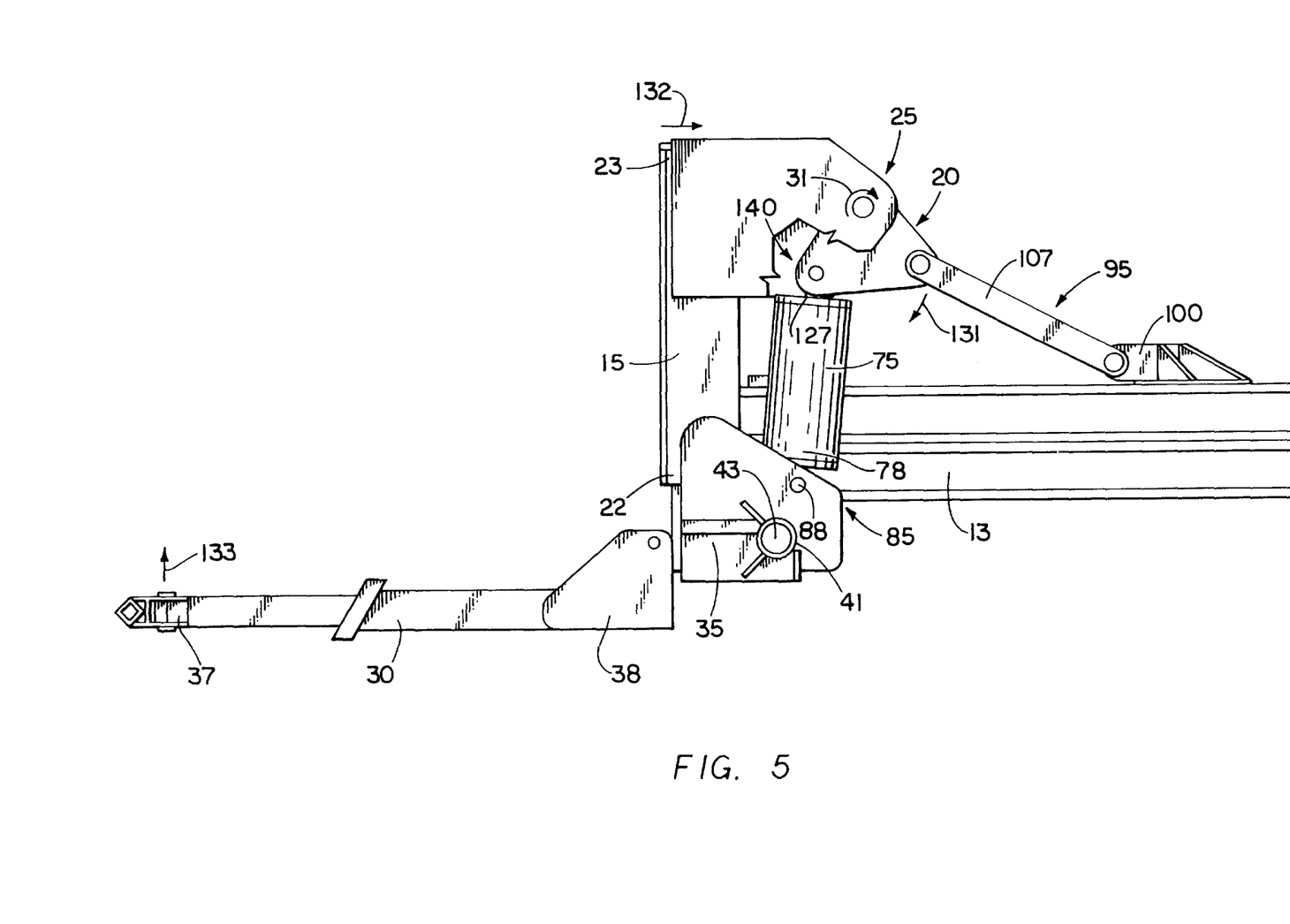
FIG. 5 is a side elevation of a lifting apparatus, according to an embodiment of this invention.
Figure 6:
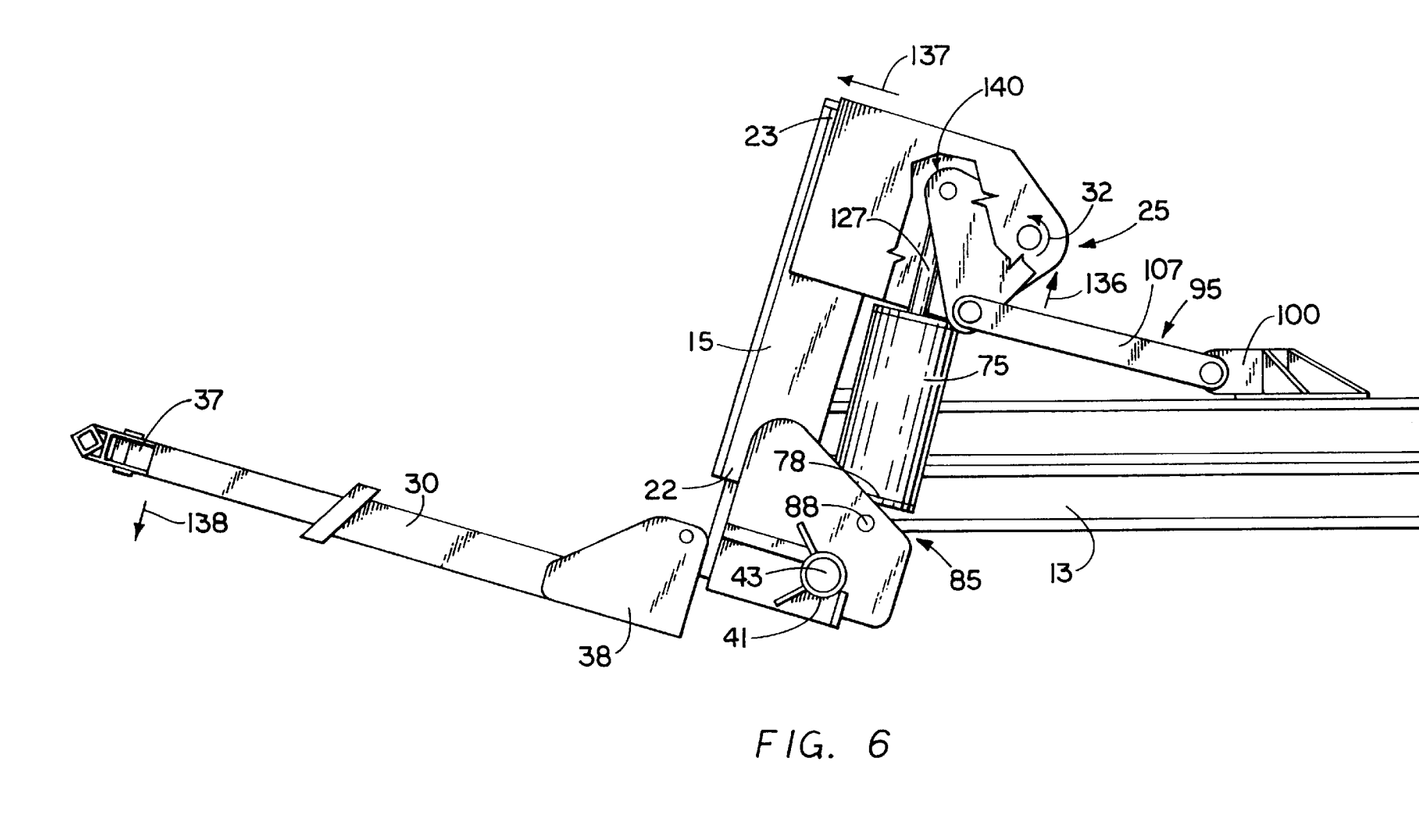
FIG. 6 is a side elevation of a lifting apparatus, according to an embodiment of this invention.

The invention provides a lifting apparatus 10 especially suited for a towing vehicle 12. FIG. 1 shows the lifting apparatus, according to an embodiment of this invention as mounted upon a frame member 13 of the towing vehicle. The lifting apparatus includes a riser 15 with a camming crank 20 pivotably attached to the riser. The camming crank can turn on its pivotable connection, herein referred to as a riser pivot 25, in either a forward direction of rotation 31 or a rearward direction of rotation 32, as shown in FIGS. 3, 5 and 6.

The lifting apparatus 10 of the present invention is further shown in FIGS. 2 through 8. The riser 15 has a riser base end 22 and a top end 23. The riser is mounted to a boom 30 proximate the riser base end. Preferably, as detailed in FIGS. 5 and 6, the riser is mounted to a base 35 also proximate the riser base end. Alternatively, the riser may attach directly to the boom, but for structural strength and ease of manufacture, the mounting of the riser member and the boom to the base is preferably utilized.

The boom 30 includes a free end 37 and a boom base end 38. Most preferably, the free end of the boom is attached to a wheel lifting assembly (not shown). The wheel lifting assembly can be any conventional design that employs a boom similar to the boom as shown in FIGS. 1, 5 and 6. The wheel lifting assembly engages the wheels of a vehicle to be lifted and towed. The boom base end is preferably mounted to the base 35. Again, as an alternative, the riser 15 may attach directly to the boom, but the mounting of the boom to the base is preferred. Most preferably, the boom mounts to the base at approximately a 90° angle to the riser.

The lifting apparatus 10 of the present invention primarily relies upon pivots to form hingeable connections. Preferably, these pivots each consist of a bearing hingeably received into a bracket and held together, in place, with a shaft or pin. The bearing and bracket join to hinge in a pivoting relationship on the shaft. Alternatively, many of the pivots described in preferred embodiments of the present invention could be replaced with other known hinging types of connections to serve the same function as the bearing, bracket and shaft type pivots, as described herein.

Figure 2:
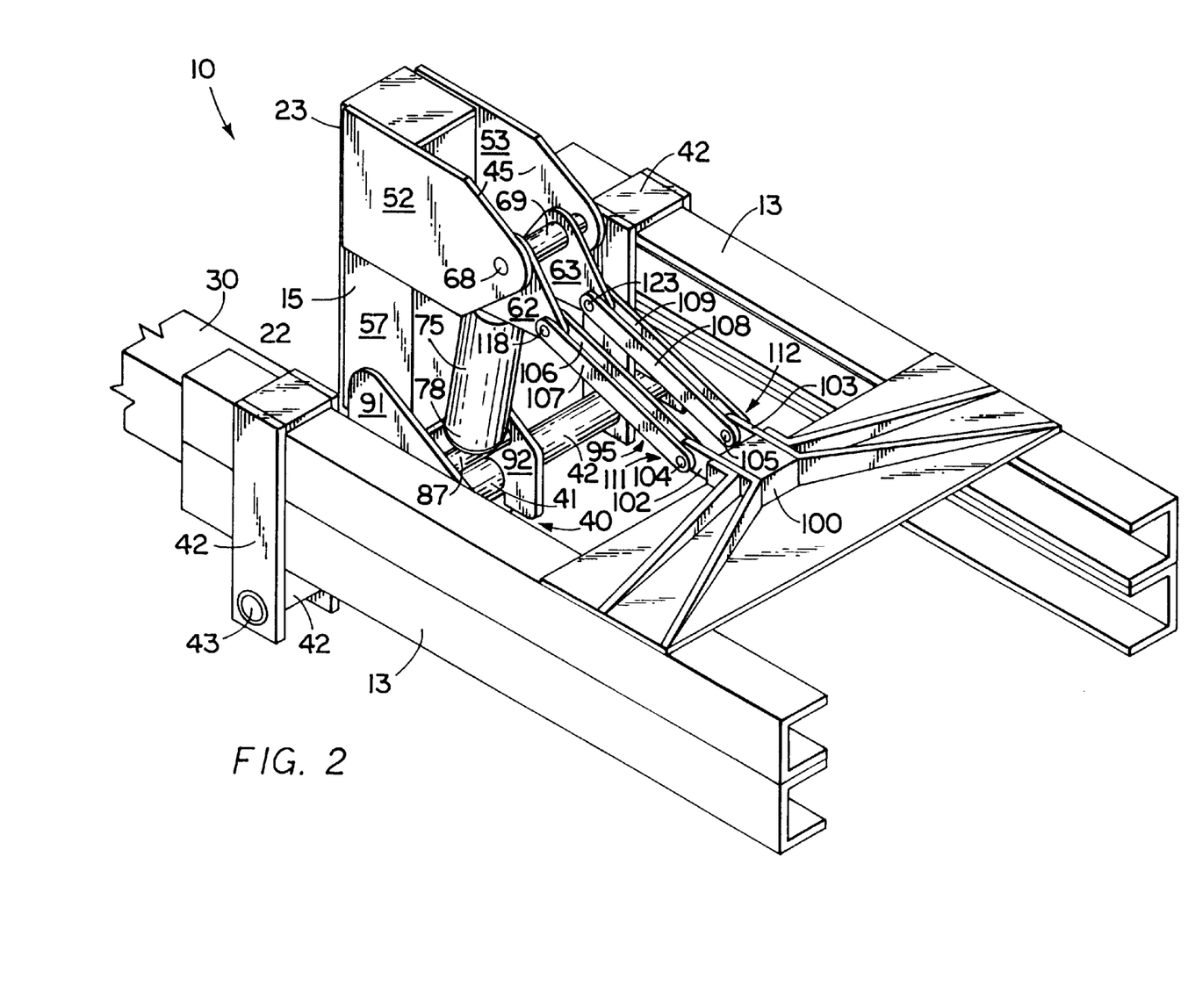
FIG. 2 is a perspective diagram of a lifting apparatus, according to an embodiment of this invention.

As detailed in FIGS. 1, 2, 5 and 6, the base 35 of the present invention includes a base frame pivot 40. The base frame pivot connects the base to the frame member 13 of the towing vehicle 12, as shown in FIGS. 1 and 2. Preferably, as shown in FIGS. 1, 2, 3, 5 and 6, the base frame pivot includes a base frame bearing 41 and a base frame bracket 42, held in a hingeable relationship with a base pivot shaft 43. The base pivot shaft is received through the base frame bracket. The base frame bracket, as shown in FIGS. 1 through 6 is immovably mounted within the base and extends through the base. The base frame bracket, as detailed in FIGS. 1 and 2, is mounted to the frame member and receives both ends of the base pivot shaft. With the boom 36 also mounted to the base, the boom can be selectively raised or lowered by pivoting the base about the base frame pivot, as shown in FIGS. 5 and 6.

The camming crank 20 of the lifting apparatus 10 is received into to a cam bracket 45. Preferably, as shown in FIGS. 1 through 3, the cam bracket is formed by a pair of riser plates. The cam bracket is mounted to the riser, proximate the top end 23 of the riser 15. Alternatively, a single riser plate could be utilized for the cam bracket, however, for strength and a symmetrical transfer of forces, the cam bracket formed with a pair of riser plates is most preferred.

Figure 4:
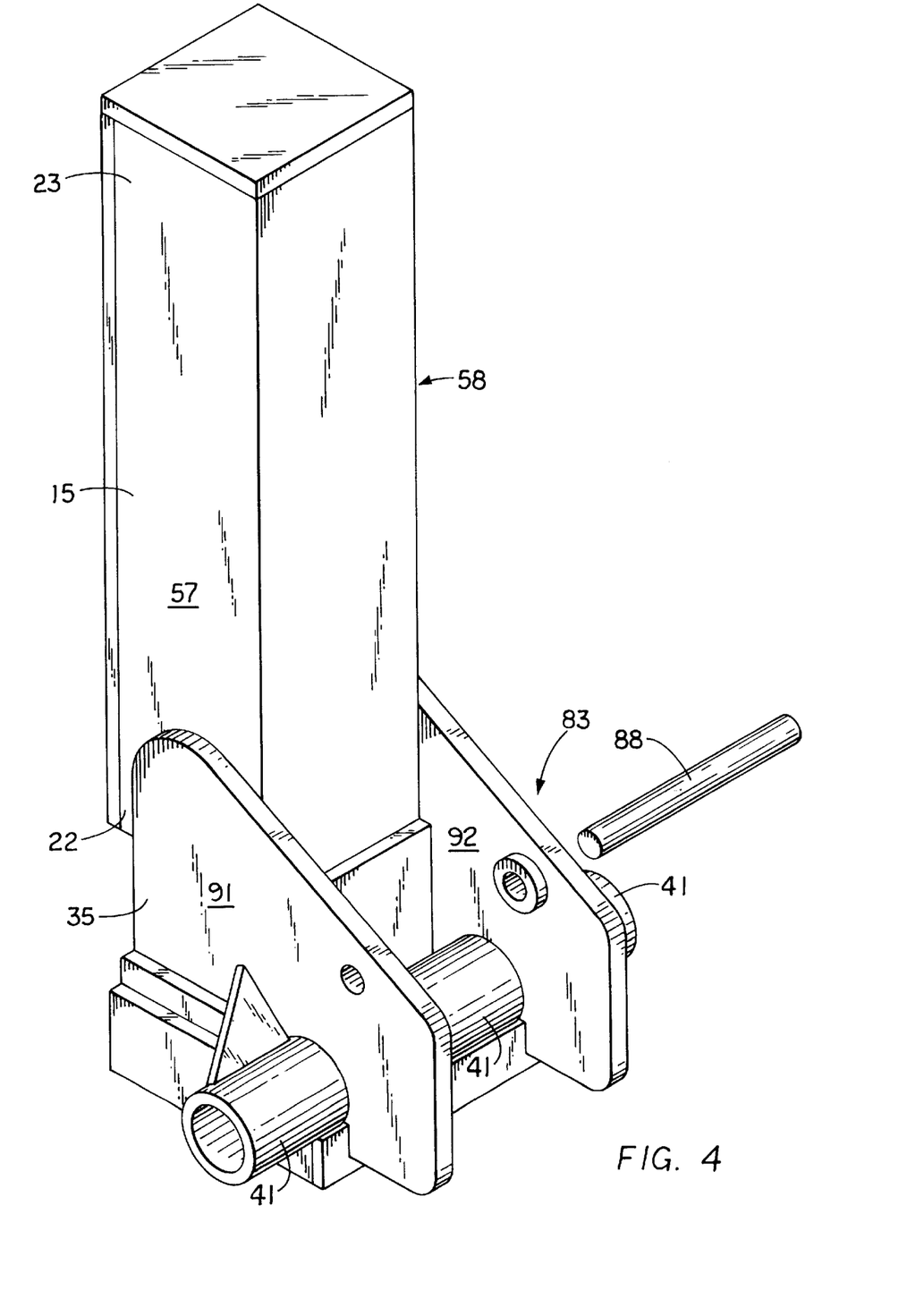
FIG. 4 is a partially exploded perspective diagram of a portion of a lifting apparatus, according to an embodiment of this invention.

As specifically detailed in FIG. 3, the pair of cam bracket 45 includes a first riser plate 52 and a second riser plate 53. As shown in FIGS. 3 and 4, the riser has a first side 57, and as shown in FIG. 1, the riser has a second side 58. As shown in FIGS. 1 through 3, the first riser plate is mounted to the first side of the riser and the second riser plate is mounted to the second side of the riser.

Figure 7:
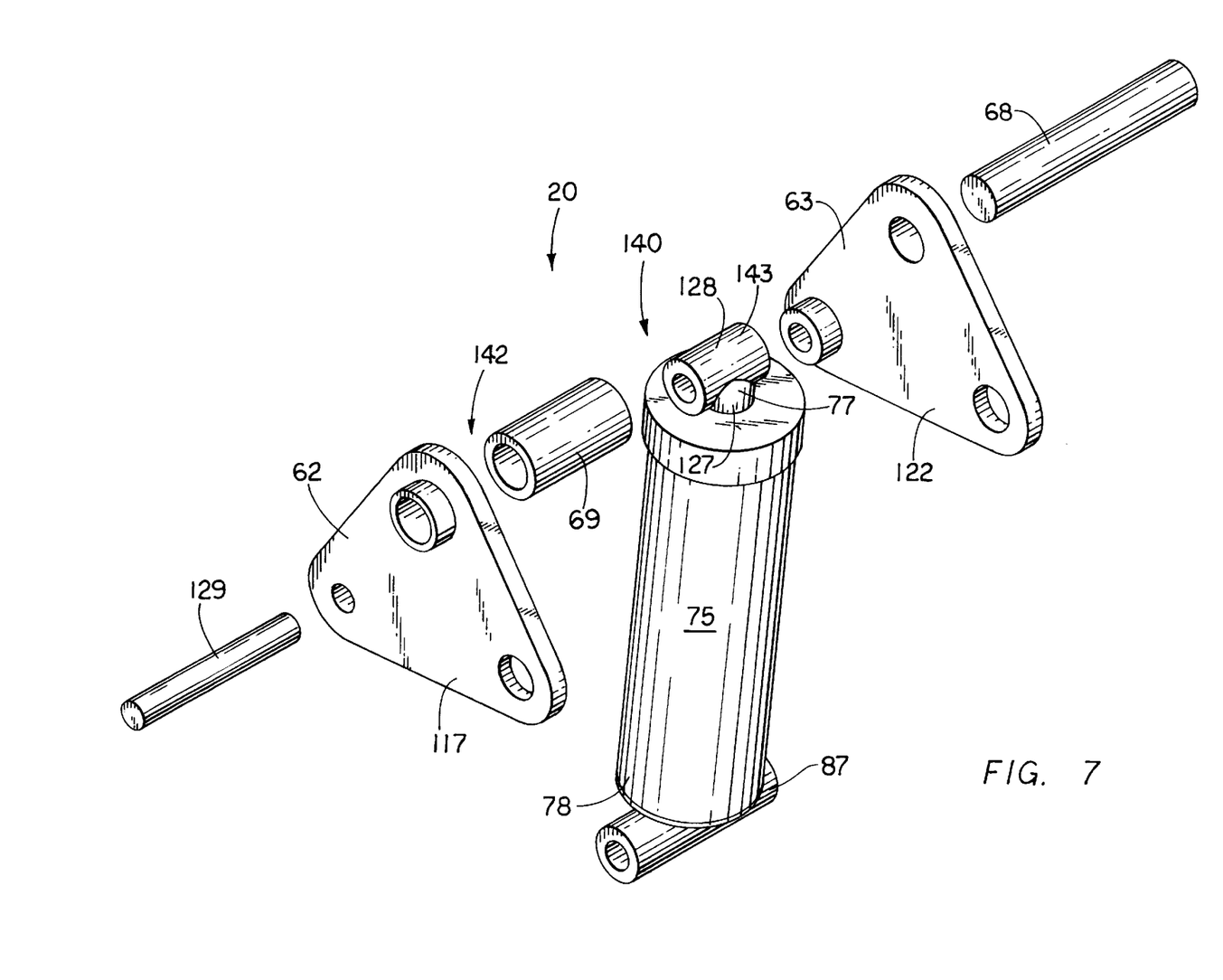
FIG. 7 is a partially exploded perspective diagram of a camming crank of a lifting apparatus, according to an embodiment of this invention.
Figure 8:
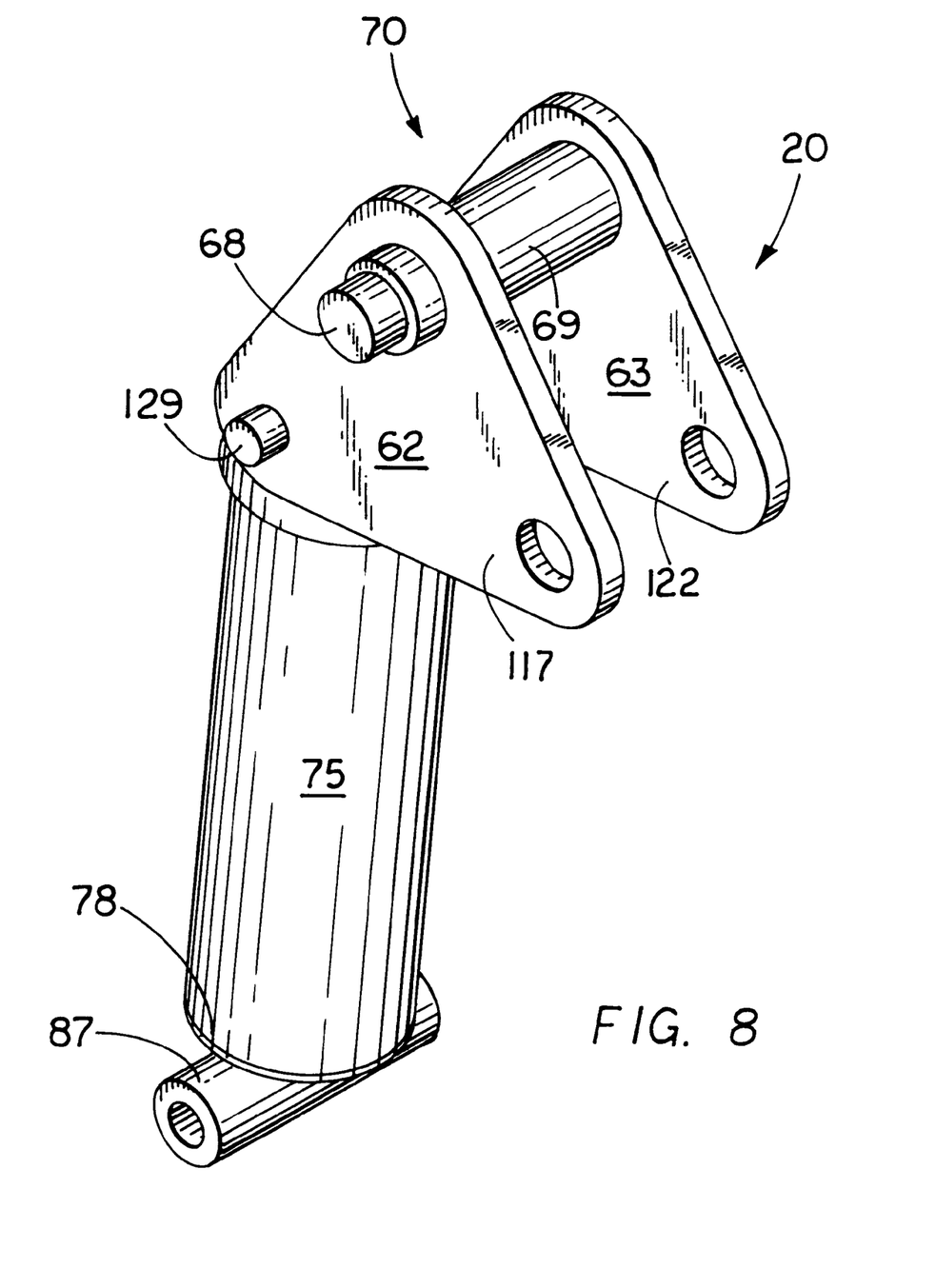
FIG. 8 is a perspective diagram of a portion of a lifting apparatus, according to an embodiment of this invention.

As specifically detailed in FIGS. 3, 7 and 8, the camming crank 20 preferably includes a first cam plate 62 and a second cam plate 63. As shown in FIGS. 1 through 3, the cam bracket 45 and the camming crank 20 are hingeably joined in a pivoting connection. This pivoting connection is again herein referred to as the riser pivot 25. The riser pivot preferably includes a riser pivot pin 68 that hingeably connects the camming crank to the camming bracket. The riser pivot pin also connects the first cam plate 62 to the second cam plate 63, as detailed in FIGS. 7 and 8. The first cam plate and the second cam plate are preferably separated by a riser pivot sleeve 69 that also receives the riser pivot pin. The first cam plate, the second cam plate and the riser pivot sleeve, together form a riser pivot bearing 70. The riser pivot bearing of the camming crank is received within the cam bracket 45, formed by the first riser plate 52 and the second riser plate 53 and is held in a pivoting relationship by the riser pivot pin. The camming crank rotates about the riser pivot pin in either a forward rotation 31 or a rearward rotation 32, as shown in FIG. 4.

As shown in FIGS. 1, through 3, and FIGS. 5 through 8, the lifting apparatus 10 also includes a crank actuator 75 for rotating the camming crank 20 about the riser pivot 25. As detailed in FIG. 7, the crank actuator includes an upper actuator end 77 and a lower actuator end 78. As detailed in FIG. 4, the lower crank actuator end is hingeably connected to the base 35 at a base actuator pivot 82. The base actuator pivot 82 is preferably located proximate the base frame pivot 40. The base actuator pivot includes a base pivot bracket 83 that receives a base pivot bearing 82, which are held together in a pivoting connection by a base pivot pin 88.

As shown in FIGS. 3, 7 and 8, the lower actuator end 78 preferably includes a base pivot sleeve 87. Preferably, the base pivot sleeve comprises the base pivot bearing 82. The base pivot sleeve receives the base pivot pin 88, as detailed in FIGS. 3 and 4. The base pivot sleeve and the base pivot pin are received into the base pivot bracket 83. The base 35 includes a first base plate 91 and a second base plate 92. Preferably, the first base plate and the second base plate form the base pivot bracket. The base pivot pin, together with the base pivot bearing are hingeably received into the base bracket, allowing the crank actuator 75 to hingeably pivot on the base about the base pivot 82.

The lifting apparatus 10 utilizes the camming crank 20 to push or pull the riser 15 about the base frame pivot 40. As shown in FIGS. 1, 2, 5 and 6, the rotation of the camming crank tilts the riser with the aid of a plurality of link arms 95 that are pivotally connected to an arm anchor 100. As detailed in FIGS. 1 and 2, the arm anchor preferably includes a first arm anchor bearing 102 and a second arm anchor bearing 103.

Most preferably, as detailed in FIG. 1 through 3, the plurality of link arms 95 comprise four link arms that connect the arm anchor 100 to the camming crank 20. Namely, a first inner link arm 106 pairs with a first outer link arm 107, and a second inner link arm 108 pairs with a second outer link arm 109.

In the most preferable configuration, as specifically detailed in FIG. 2, the first inner link arm 106 and the first outer link arm 107 together bracket the first arm anchor bearing 102. A first arm anchor shaft 104 hingeably connects the first inner link arm and the first outer link arm to the first anchor arm bearing to form a first arm anchor pivot 111. Correspondingly, a second anchor arm pivot 112 is formed by the second inner link arm 108 and the second outer link arm 109 together bracketing the second arm anchor bearing 103, which are all held in a hinging relationship by a second arm anchor shaft 105.

The plurality of link arms 95 are also hingeably connected to the crank 20, as detailed in FIG. 3. A first crank arm bearing 117 on the first cam plate 62, together with a first crank arm shaft 118, receives the inner link arm 106 and the first outer link arm 107. The first inner link arm and the first outer link arm together bracket the first crank arm bearing. The first inner link arm and the first outer link arm are held together in a hinging relationship by the first crank arm shaft to form a first crank arm pivot 120.

Correspondingly, a second crank arm bearing 122 on the second cam plate 63, together with a second crank arm shaft 123, receive the second inner link arm 108 and the second outer link arm 109. The second inner link arm 108 and the second outer link arm bracket the second crank arm bearing to form a second crank arm pivot 124. The first crank arm pivot and the second crank arm pivot together form a crank arm pivot pair 125.

In an alternative embodiment, instead of the crank arm pivot pair 125, a single crank arm pivot could be formed by including a single crank arm pivot interconnecting the first crank arm bearing 117 and the second crank arm bearing 122. For this alternative embodiment, a single link arm, rather than the plurality of link arms 95, could be employed to connect the arm anchor 100 to the camming crank 20. Additionally in this single link arm embodiment, a single arm anchor pivot would replace the first arm anchor arm pivot 102 and the second arm anchor pivot 103.

As previously discussed herein, the camming crank 20 is preferably rotated about the riser pivot 25 to tilt the riser 15 by action of the crank actuator 75. As detailed in FIG. 7, the crank actuator includes an actuator piston 127. The upper crank actuator end 77 receives the actuator piston. As also detailed in FIG. 7, the actuator piston includes an actuator piston sleeve 128 mounted proximate the upper actuator end of the crank actuator for receiving an actuator pivot pin 129. The actuator pivot pin connects the crank actuator to the camming crank.

As also detailed in FIGS. 5, 6 and 7, the camming crank 20 also includes an actuator pivot 140. The actuator pivot includes an actuator bracket 142, an actuator bearing 143 and the above described actuator pivot pin 129. The actuator bracket is formed by the first cam plate 62 and the second cam plate 63 of the camming crank. In this preferred embodiment, the actuator bearing is the actuator piston sleeve 128. Any conventional means for mounting the actuator pivot pin, as with any other shaft or pin utilized in the present invention can be employed. Preferably snap rings are utilized, however mounting methods such as cotter pins, cap pieces or cap bolts are also considered as alternatives.

As an additional alternative to the preferred configurations of brackets and bearings to form the pivots of the present invention as shown in FIGS. 1 through 8, the relative positions of the pivot brackets and pivot bearings may be interchanged, the brackets becoming the bearings and visa-versa.

In a preferred method of the present invention, the free end 37 of the boom 30 is raised by extending the piston 127 of the actuator 75, which is mounted to and connects the base 35 to the camming crank 20. Extending the piston of the actuator turns the camming crank in the forward rotation 31, as shown in FIG. 3 and detailed in FIG. 5. This forward rotation of the camming crank thereby causes the crank arm pivot pair 125 to hinge in a downward direction 131 on the arm anchor 100. This forward rotation of the camming crank forces the riser 15 to pivot in a forward direction 132 upon the base frame pivot 40, toward the arm anchor. The pivoting riser causes the free end 37 of the boom 30 to lift in an upward direction 133, as also shown in FIG. 5.

Conversely, when the piston 127 of the actuator 75 retracts, the camming crank 20 is turned in the rearward rotation 32, as shown in FIG. 3 and detailed in FIG. 6. This rotation of the camming crank in the rearward rotation thereby causes the crank arm pivot pair 125 to hinge in a upward direction 136 on the arm anchor 100. This rearward rotation of the camming crank forces the riser 15 to pivot in a rearward direction 137 upon the base frame pivot 40, away from the arm anchor. The pivoting riser causes the free end 37 of the boom 30 to lower in a downward direction 138, as also shown in FIG. 6.

As shown in FIGS. 4 through 7, the crank actuator 75 is preferably of a typical hydraulic design and includes a piston 105 housed within a cylinder 110. When the piston extends, it forces the camming crank to turn in the forward direction of rotation 90. Conversely, as the piston retracts, it forces the camming crank to turn in the rearward direction of rotation 95. Alternatively, an equivalent force means such as a mechanical gear system or rack and pinion gear, or an equivalent extendable and retractable actuator, such as a pneumatic actuator or a screw drive, could all replace the hydraulic actuator.

The camming crank 20 of the present invention has two primary points of pivoting attachment; the base frame pivot 40 and the arm anchor 100. To operate the present invention, the crank actuator 75 either extends to push upon, or retracts to pull upon the camming crank. In this way, the crank actuator forces the camming crank, depending on the action of the crank actuator, to either rotate about the riser plate pivot, in either the forward rotation 31, when the crank actuator extends, or the rearward rotation 32, when the crank actuator retracts. Also depending on the rotation of the camming crank, to the link arms 70 will likewise either be pulled or pushed, upon, with the arm anchor as an immobile base.

To raise free end 37 of the boom 30, the crank actuator 75 pushes the actuator pivot 66 on the camming crank upward, and thereby rotates the camming crank 20 in the forward rotation 31. As the camming crank turns in the forward rotation, the link arm pivot pair 85 pulls upon the link arms 95, while the arm anchor 100 remains static. The top end 33 of the riser 15 pivots in a forward direction 141 as it is pulled toward the arm anchor by the rotation of the camming crank.

The extending force of the actuator 75, translates to an upward force of the boom 30, with a high degree of efficiency. A mechanical advantage is gained by levering the riser 15, resulting in a more effective mechanism for mechanical lift, as compared to directly actuating the boom. As the actuator extends, it not only rotates the crank, but also forces the base 35 to rotate about the anchor pivot, thereby providing an additional mechanical levering advantage, translated across the base frame pivot 40, to force the boom upward. Additionally, this extension of the crank actuator forces the boom upward, rather than the direct retraction of an actuator, as found in conventional lifting apparatus. Due to these mechanical advantages, the size and weight of the crank actuator is additionally minimized, and the structural strength and weight capacity of the lifting apparatus 10 is maximized.

Towing vehicles 12 such as trucks are typically retrofitted with the lift apparatus 10 of the present invention. The lift apparatus' manufacturer receives the truck at its factory, where the lift apparatus is installed. The lift apparatus is compact by virtue of the L-shaped riser 15 and connected boom 30. The boom and the riser closely integrate with the camming crank 20 and the crank actuator 75, and located between the riser 15 and the link arms 95. The lift apparatus also accommodates the frame 13 of the truck with the base frame bracket 42, effectively sandwiching the frame member for structural support.

The lifting apparatus 10 of the present invention easily adapts to avariety of applications. The free end 37 of the boom 30 can be fitted with a tire engaging wheel carriage assembly (not shown) for wheel-lifts. Other applications for the lifting apparatus of the present invention are also contemplated. The lifting apparatus could also be mounted on a fork lift type vehicle. Additionally, the lifting apparatus could be adapted to lift or partially lift boats, airplanes, tracked vehicles, and tractors. Stationary or non-mobile installations for the lifting apparatus are also contemplated. Gangways serving water craft or aircraft, loading dock ramps, security gates and draw bridges could utilize the lifting apparatus of the present invention.

In use, the lifting apparatus 10 of the present invention is attached to the frame 13 of the towing vehicle 12 or tow truck. Preferably, the lifting apparatus is further equipped with a wheel carriage assembly (not shown), which is positioned by an operator to a vehicle (not shown). When the free end 37 of the boom 30 is moved in the downward direction 138, the operator can then affix the front or rear wheels of the vehicle to the wheel carriage assembly. The operator can then raise the free end of the boom in the upward direction 133, and then drive the tow truck away, with the lifted vehicle trailing behind, and the two lifted wheels fully supported by the tow truck. If the vehicle's brakes are engaged or the vehicle is in gear and thus prevented from rolling freely, a wheeled dolly can be placed beneath the wheels of the towed vehicle.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the following claims, as appropriately interpreted in accordance with the doctrine of equivalents.

What is claimed is:

1. A vehicle lifting apparatus comprising:
   a riser having a top end and a riser base end, the riser pivotably mounted to a frame proximate the riser base end at a base frame pivot;
   a boom having a free end and a boom base end, the boom base end mounted to the riser proximate the riser base end;
   a riser plate,
      the riser plate mounted to the riser proximate to the top end of the riser;
   a camming crank pivotably attached to the riser plate;
      the camming crank hingeably connected to the riser plate to form a riser pivot;
   an arm anchor mounted to the frame;
   a link arm for connecting the anchor to the camming crank,
      the link arm hingeably connected to the arm anchor to form an arm anchor pivot, and
      the link arm hingeably connected to the camming crank to form a crank arm pivot; and
   a crank actuator having an upper actuator end and a lower actuator end,
      the upper actuator end hingeably connected to the camming crank to form an actuator crank pivot,
      the lower actuator end pivotably mounted to the riser, proximate the riser base end to form a base actuator pivot, and
      the crank actuator for rotating the camming crank about the riser pivot, to pivot the riser on the base frame pivot, selectively toward or away from the arm anchor, to respectively raise or lower the free end of the boom.

2. The lifting apparatus of claim 1, wherein the frame is a frame of a towing vehicle.

3. The lifting apparatus of claim 1, wherein the frame is a frame of a towing vehicle for the purpose of lifting a vehicle.

4. The lifting apparatus of claim 1, wherein the crank actuator rotates the camming crank in a forward direction of rotation about the upper frame pivot bearing, to pull on the link arm, and pivotably tilt the riser on the base frame pivot, toward the arm anchor, forcing the link arm to hinge in a downward direction on the arm anchor and the riser to pivot in the forward direction upon the base frame pivot toward the arm anchor, to raise the free end of the boom.

5. The lifting apparatus of claim 1, wherein the crank actuator rotates the camming crank in a rearward direction of rotation about the upper frame pivot bearing, to push on the link arm, and pivotably tilt the riser on the base frame pivot, away from the arm anchor, forcing the link arm to hinge in a upward direction on the arm anchor and the riser to pivot in the rearward direction upon the base frame pivot away from the arm anchor, to lower the free end of the boom.

6. The lifting apparatus of claim 1, wherein the crank actuator is an extending and retracting actuator.

7. The lifting apparatus of claim 6, wherein the extending and retracting actuator is a hydraulic cylinder and piston.

8. The lifting apparatus of claim 1, wherein:
   the link arm is a plurality of linkage arms,
   the arm anchor pivot bracket is a plurality of arm anchor pivots, and
   the crank arm pivot is a plurality of crank arm pivots.

9. A method for raising a boom leg of a lifting apparatus which comprises:
   a) extending a crank actuator, the crank actuator attached to a camming crank at an actuator crank pivot;
   b) rotating the camming crank with by the extension of the crank actuator in a forward direction of rotation about a riser pivot, the camming crank attached to a riser at the riser pivot, the riser having a top end and a riser base end, the riser pivotably mounted to a frame proximate the base end of the riser, the camming crank pivotably attached to a riser plate, the riser plate mounted to the riser proximate to the top end of the riser, and the riser pivot proximate to the top end of the riser;

c) pulling a link arm with the rotating camming crank, the link arm attached to the camming crank at a crank arm pivot, the linkage arm attached to an arm anchor at an arm anchor pivot, the arm anchor mounted to a frame;

d) tilting the riser on a base frame pivot, toward the arm anchor, the base frame pivot formed by the riser hingeably mounted to the frame; and e) raising the free end of a boom, the boom having a free end and a boom base end, the boom base end mounted proximate the riser base end.

10. The method of claim 9, with the additional step of:

f) lifting a vehicle with the raising of the free end of the boom.

11. A method for lowering a boom leg of a lifting apparatus which comprises:

a) retracting a crank actuator, the crank actuator attached to a camming crank at an actuator crank pivot;

b) rotating the camming crank with by the extension of the crank actuator in a rearward direction of rotation about a riser pivot, the camming crank attached to a riser at the riser pivot, the riser having a top end and a riser base end, the riser pivotably mounted to a frame proximate the base end of the riser, the camming crank pivotably attached to a riser plate, the riser plate mounted to the riser proximate to the top end of the riser, and the riser pivot proximate the top end of the riser;

c) pushing a link arm with the rotating camming crank, the link arm attached to the camming crank at a crank arm pivot, the linkage arm attached to an arm anchor at an arm anchor pivot, the arm anchor mounted to a frame;

d) tilting the riser on a base frame pivot, away from the arm anchor, the base frame pivot formed by the riser hingeably mounted to the frame; and e) lowering the free end of a boom, the boom having a free end and a boom base end, the boom base end mounted proximate the riser base end.

12. The method of claim 11, with the additional step of:

f) lowering a vehicle with the lowering of the free end of the boom.

* * * * *